H. B. & H. T. Lawton.
Cotton Batting.
No. 219. Reissued Jun. 22, 1852.
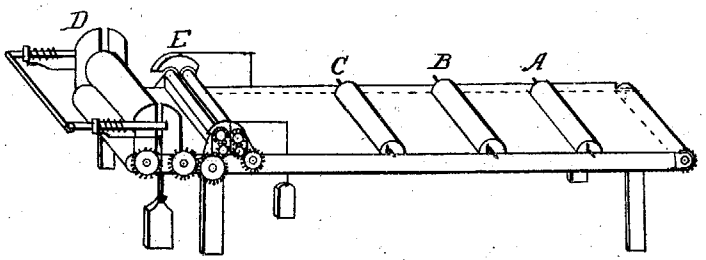
N. PETERS, PHOTO-LITHOGRAPHER, WASHINGTON, D. C.

UNITED STATES PATENT OFFICE.

HAMILTON B. LAWTON AND HIRAM T. LAWTON, OF TROY, NEW YORK.

IMPROVEMENT IN BATTING OF COTTON OR OTHER FIBROUS MATERIAL.

Specification forming part of Letters Patent No. 6,189, dated March 13, 1849; Reissue No. 219, dated June 22, 1852.

*To all whom it may concern:*

Be it known that we, HAMILTON B. LAWTON and HIRAM T. LAWTON, of the city of Troy and State of New York, have invented a new and useful improvement in the method of preparing cotton, wool, hair, and other elastic fibrous substances for batting and wadding; and we do hereby declare that the following is a full and exact description of the same, reference being had to the annexed drawing, making a part of this specification.

The figure represents an endless apron with a set of pressing-rollers attached at E; A, a thin sheet or layer of cotton or other suitable fibrous material that has been carded, compressed, and condensed, and rolled up and laid upon the apron.

B represents the batting which has been merely well picked, cleaned, and spread in the usual manner of preparing the same for carding, &c. This batting being laid upon the layer A is then covered with a second sheet or layer, C, which is the same as A. The whole is then carried forward by the revolving motion of the apron through the pressing-rollers E and is rolled up at D, making a combination of carded condensed cotton or other elastic fibers with that which has been merely picked, cleaned, and spread for batting or wadding, of any required length, width, or thickness.

The advantage of this method is in rendering elastic fibrous material which has been merely well picked, cleaned, and spread smooth upon its surfaces, and hence preventing it from sticking or reuniting together when packed and pressed in bales; second, in making the same stronger and more durable while in use; third, in shortening the process and reducing the expenses of preparing all elastic fibrous materials for bedding, mattresses, and upholstery purposes.

Be it distinctly known that we do not claim as our invention the mode of operating a series of carding-machines to make batting, as shown by J. Essex's drawings, nor any part of the above-described machine.

What we do claim as our invention and discovery is—

The method of making batting or wadding by laying on and covering both the upper and lower surfaces of a sheet or sheets of cotton, wool, hair, or other elastic fibrous material that has been merely well picked, cleaned, and spread, with layers of carded, condensed, and compact fibers—such as cotton, wool, hemp, &c.—for the purpose of rendering the same smooth, strong, and more suitable for bedding, wadding, and upholstery uses.

HAMILTON B. LAWTON.
HIRAM T. LAWTON.

Witnesses:
NORMAN MILLER,
ALEXR. C. LAWTON.